US008868478B2

(12) United States Patent
Bouchard

(10) Patent No.: US 8,868,478 B2
(45) Date of Patent: Oct. 21, 2014

(54) TENSOR TRACE NORM AND INFERENCE SYSTEMS AND RECOMMENDER SYSTEMS USING SAME

(75) Inventor: Guillaume M. Bouchard, Saint-Martin-le-Vinoux (FR)

(73) Assignee: Xerox Corporation, Norwalk, CT (US)

( * ) Notice: Subject to any disclaimer, the term of this patent is extended or adjusted under 35 U.S.C. 154(b) by 240 days.

(21) Appl. No.: 13/484,476

(22) Filed: May 31, 2012

(65) Prior Publication Data

US 2013/0325781 A1    Dec. 5, 2013

(51) Int. Cl.
*G06F 17/00*    (2006.01)
(52) U.S. Cl.
USPC .......................................................... 706/45
(58) Field of Classification Search
USPC ........................................... 706/1, 12, 45, 62
See application file for complete search history.

(56) References Cited

PUBLICATIONS

Abernethy, J., Bach, F., Evgeniou, T., & Vert, J. P., Low-rank matrix factorization with attributes, 2006, arXiv preprint cs/0611124, pp. 1-12.*
Narita et al., Tensor factorization using auxiliary information, 2012, Springer, pp. 1-27.*
Acar et al., All-at-once Optimization for Coupled Matrix and Tensor Factorizations, 2011, arXiv, pp. 1-9.*
Acar, et al., "Scalable tensor factorizations for incomplete data," Chemometrics and Intelligent Laboratory Systems, vol. 106(1), pp. 1-34 (May 12, 2010).
Bach, et al., "Convex Sparse Matrix Factorizations," Technical Report, HAL-00345747, pp. 1-12 (Dec. 9, 2008).
Gandy, et al., "Tensor completion and low-n-rank tensor recovery via convex optimization," Inverse Problems 27.2 pp. 1-19 (Jan. 24, 2011).
Jaggi, et al., "A Simple Algorithm for Nuclear Norm Regularized Problems," Proc. $27^{th}$ International Conference on Machine Learning (ICML 2010), pp. 471-478 (2010).
Kolda, et al., "Tensor decompositions and applications," SIAM review, 51(3), pp. 1-47 (Jun. 10, 2008).
Liu, et al., "Tensor completion for estimating missing values in visual data," Computer Vision, 2009 IEEE $12^{th}$ International Conf. pp. 1-14 (Sep. 29 2009-Oct. 2 2009).
Rennie, et al., Fast Maximum Margin Matrix Factorization for Collaborative Prediction, Proceedings of the $22^{nd}$ International Conference on Machine Learning, pp. 713-719 (Aug. 2005).
Signoretto, et al., "Nuclear norms for tensors and their use for convex multilinear estimation," ESAT-SISTA, KU Leuven, Technical Report, pp. 10-186 (Sep. 10, 2010).
Srebro, et al., "Maximum-Margin Matrix Factorization," Advances in Neural Information Processing Systems 17, pp. 1329-1336 (2004).

(Continued)

Primary Examiner — David Vincent
(74) Attorney, Agent, or Firm — Fay Sharpe LLP

(57) ABSTRACT

A convex regularized loss function is minimized respective to a prediction tensor of order K to generate an optimized prediction tensor of order K where K>2. The convex regularized loss function comprises a linear combination of (i) a loss function comparing the prediction tensor and an observation tensor of order K representing a set of observations and (ii) a regularization parameter including a K-th order matrix norm decomposition of the tensor trace norm of the prediction tensor. In some such embodiments, the observation tensor of order K represents a set of social network observations and includes at least dimensions corresponding to (1) users, (2) items, and (3) tags. The optimized prediction tensor of order K is suitably used to perform inference operations.

20 Claims, 2 Drawing Sheets

(56) References Cited

PUBLICATIONS

Sutskever, et al., "Modelling relational data using Bayesian clustered tensor factorization," Advances in Neural Information Processing Systems, NIPS, pp. 1-8 (2009).

Shi, et al., "Trace Norm Regularized Tensor Classification and Its Online Learning Approaches," arXiv: 1109.1342, pp. 1-11 (Sep. 7, 2011).

Tomioka, et al., "On the extension of trace norm to tensors," ArXiv preprint 1010.0789, pp. 1-4 (2010).

Tomioka, et al., "Estimation of low-rank tensors via convex optimization," ArXiv preprint 1010.0789v2, pp. 1-19 (Mar. 2, 2011).

Kroonenberg, "Three-Mode Component Models a Survey of the Literature," Statistica Applicata vol. 4, No. 4 pp. 619-633 (1992).

Tucker, "Relations Between Multidimensional Scaling and Three-Mode Factor Analysis," Project on Techniques for Investigation of Structure of Individual Differences in Psychological Phenomena, pp. 1-34 (Jul. 1970).

Vasilescu, et al., "Multilinear Projection for Appearance-Based Recognition in the Tensor Framework," Computer Vision, 2007. ICCV 2007. IEEE 11th International Conference on Computer Vision, pp. 1-8 (Oct. 2007).

\* cited by examiner

TENSOR TRACE NORM AND INFERENCE SYSTEMS AND RECOMMENDER SYSTEMS USING SAME

BACKGROUND

The following relates to the online retail arts, online service provider arts, recommender system arts, collaborative filtering arts, and related arts.

Efficient computation of tensor trace norms finds application in numerous problems, such as recommender systems and other inference problems operating on sparse tensors. The number of dimensions of the tensor (also call the "degree" or "order" of the tensor) is denoted by K herein. A matrix is a tensor of order 2, and similarly a vector is a order-1 tensor. A tensor may also be of order K>2, and there is no upper limit on the possible order of a tensor.

By way of illustration, recommender systems find application in solving numerous problems having a context made up of elements of different types. For example, consider an electronic social network context having the following element types: users (individuals or, in some social networks, entity users); items (e.g., uploaded images, video, et cetera); and tags (e.g., comments or keywords associated to users and/or items). Within this social network context, various recommendation problems can arise. For example: it may be desired to recommend tags (e.g. keywords) for labeling an item; or, it may be desired to retrieve items of interest to a particular user; or so forth. These recommendation problems can be formulated mathematically as a tensor of order K=3 with one dimension listing all users, one dimension listing all items, and one dimension listing all tags. This tensor is sparse, because most possible element-element associations (e.g., user-user links, user-item links, item-tag associations, et cetera) do not actually exist. For example, most items have no tag, a given user is not linked to most items, and so forth.

As another illustrative example, an automated call center has a context including entities such as the customer, the service person, and the time of the call. In this context, an illustrative recommendation problem is to select a service person to handle a call from a given customer at a given time. The problem can be formulated using a sparse tensor of order K=3 where one dimension is the service persons, one dimension is the customers, and one dimension is time (optionally discretized with a chosen uniform or non-uniform granulation). The tensor is sparse because few of the possible (service person-customer-time) tensor elements correspond to actual call data.

As a further illustrative example, certain chemical optimization problems have the context of a set of constituent components that can be combined in various combinations to produce a chemical of interest. To illustrate, in the development of new ink formulations, various constituent chemicals can be variously combined. (The problem can be further expanded to encompass different types of paper or other media for which the ink may be useful for marking). In such a problem, testing is performed on different ink formulations. However, with even a few possible constituent chemicals it becomes prohibitive to exhaustively test all possible ink formulations. Accordingly, it would be useful to provide a predictive algorithm to estimate the efficiency of new ink formulations for testing by identifying the most promising chemical combinations. Again, the problem can be represented as a sparse tensor, here of order K equal to the number of constituent components under consideration for inclusion in the new ink formulation. (If paper type is another development parameter, then K is suitably the number of considered constituent components plus an additional dimension for the paper type). The tensor is sparse because only a few possible formulations have actually been tested.

The foregoing recommender system examples can be generalized to an inference engine in general that operates in a multidimensional space of dimensionality K>2 for which only sparse sampling is available, and for which it is desired to infer values for points in the space that have not (yet) been sampled. Such inference problems go by various nomenclature such as recommendation problems, collaborative filtering problems, data imputation, multitask structured learning problems, multi-dimensional regularization and so forth. Other examples of applications that can usefully employ such inference include personality type profiling based on multi-criterion questionnaires, modeling non-Gaussian interactions by modeling correlation of high orders, computer vision problems solved using tensor decomposition formulations, and so forth.

Recommendation or inference problems operating in a space of dimensionality K>2 can be constructed as a likelihood estimation that minimizes a loss function between the sparse observation tensor (denoted herein as tensor Y) containing the available data (e.g., the actual user-user links, or logged call center data, or tested ink formulations) and a prediction tensor of the same order and size (denoted herein as prediction tensor X). This minimization can be written as min l(X; Y) where the loss function l(X; Y) is preferably strictly convex, which implies a single minimum, to ensure a unique minimum and computational efficiency. In practice, however, it is found that the likelihood estimation can be adversely affected by sparseness of the observation tensor Y and/or noise in the observed elements of the observation tensor Y.

It is known to instead perform a regularized likelihood estimation of the form $\min\{l(X;Y)+\lambda\|X\|\}$ where $\lambda\|X\|$ is a regularization or penalty term, $\|X\|$ is a tensor norm, and $\lambda$ is a tuning parameter selected (e.g., by cross-validation) to prevent overfitting. The tensor norm $\|X\|$ should again preferably be convex. However, existing formulations of the tensor norm are problematic, as they typically are computationally arduous and/or are not convex optimizations.

BRIEF DESCRIPTION

In some illustrative embodiments disclosed as illustrative examples herein, a non-transitory storage medium stores instructions executable by an electronic data processing device to perform a method including minimizing a convex regularized loss function respective to a prediction tensor X of order K having dimensions $n_1, n_2, \ldots, n_K$ to generate an optimized prediction tensor of order K where K>2 and the convex regularized loss function comprises a linear combination of (i) a loss function l(X; Y) comparing the prediction tensor X and an observation tensor Y of order K representing a set of observations and (ii) a regularization parameter $\lambda\|X\|_*$ where $\lambda$ is a scalar value and $\|X\|_*$ is a K-th order matrix norm decomposition of the tensor trace norm of the prediction tensor X given by $$\|X\|_* = \frac{1}{K}(\min_{A_1 \otimes A_2 \otimes \ldots \otimes A_K = X}(\|A_1\|_K^K + \|A_2\|_K^K + \ldots + \|A_K\|_K^K))$$

where $A_k \in \mathfrak{R}^{n_k \times R}$, $R=\max\{n_1, n_2, \ldots, n_K\}$, $\|A_K\|_K$ is the K-th order matrix norm of $A_k$, and $\otimes$ denotes the outer matrix product operator. In some such embodiments, the observation tensor of order K represents a set of social network observations and includes at least dimensions corresponding to (1) users, (2) items, and (3) tags. The optimized prediction tensor of order K is suitably used to perform inference operations.

In some illustrative embodiments disclosed as illustrative examples herein, an apparatus comprises: a non-transitory storage medium as set forth in the immediately preceding paragraph; and an electronic data processing device configured to execute instructions stored on the non-transitory storage medium.

In some illustrative embodiments disclosed as illustrative examples herein, a method comprises: minimizing a convex regularized loss function respective to a prediction tensor of order K to generate an optimized prediction tensor of order K where K>2 and the convex regularized loss function comprises a linear combination of (i) a loss function comparing the prediction tensor and an observation tensor of order K representing a set of observations and (ii) a regularization parameter including a matrix norm decomposition of the tensor trace norm of the prediction tensor; and performing an inference operation using the optimized prediction tensor. The minimizing does not employ tensor unfolding. The minimizing and the performing of an inference operation are suitably performed by an electronic data processing device.

DETAILED DESCRIPTION

Figure 1:
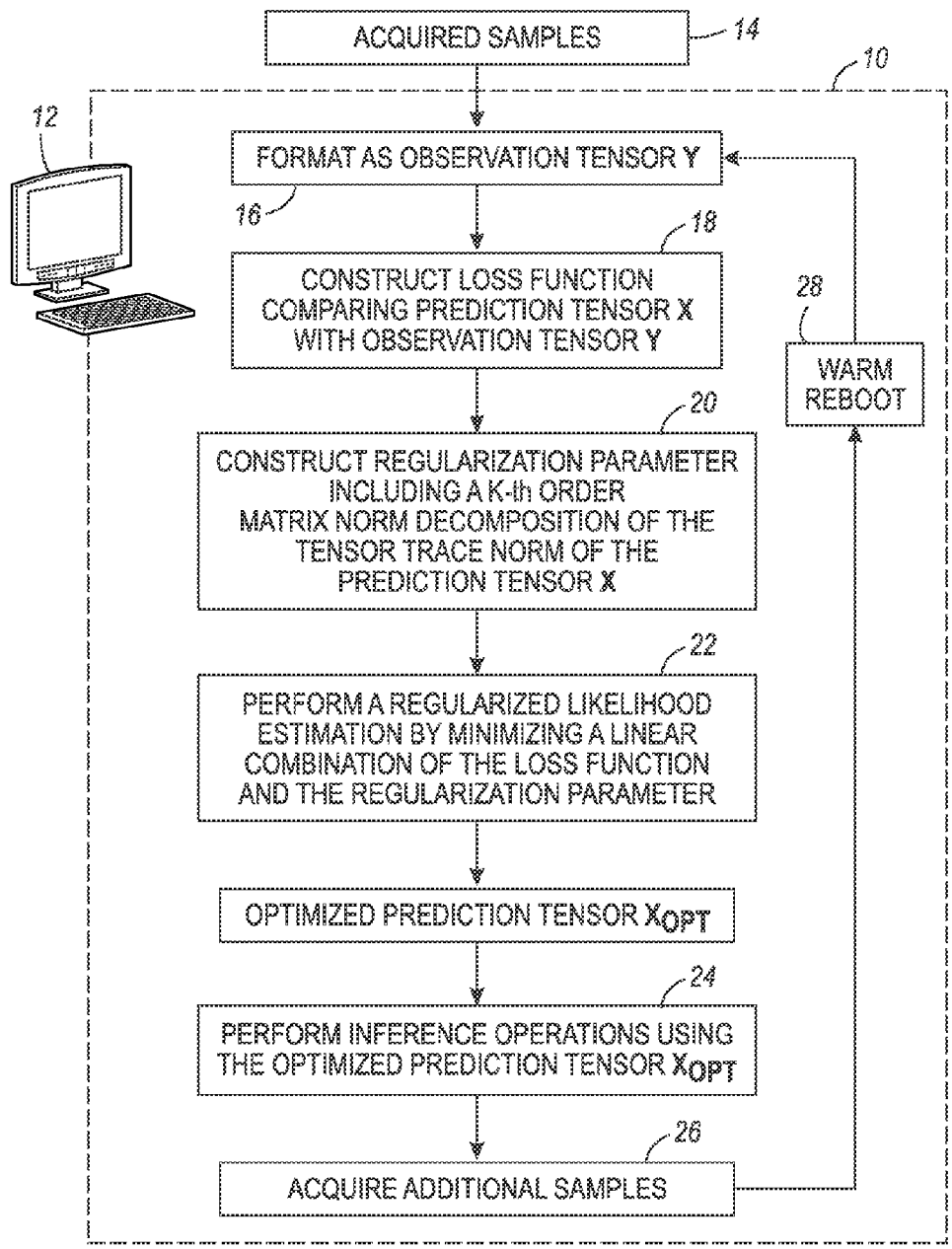
FIG. 1 diagrammatically shows an illustrative inference system.

With reference to FIG. 1, an inference system 10 is implemented by a computer or other electronic data processing device 12 that includes a processor (e.g., microprocessor, optionally multi-core) and data storage and that executes instructions to perform operations including: formatting acquired samples 14 as an observation tensor Y in an operation 16; constructing a loss function in an operation 18; constructing a regularization parameter in an operation 20; performing a regularized likelihood optimization in an operation 22 to optimize a prediction tensor X in order to generate an optimized prediction tensor $X_{opt}$; performing inference operations 24 using the optimized prediction tensor $X_{opt}$; and optionally performing periodic inference system updates by collecting additional samples in an operation 26 and performing a reboot 28 entailing repeating the operations 16, 18, 20, 22 to update the optimized prediction tensor X. The instructions that are executed by the computer or other electronic data processing device 12 to perform the operations 16, 18, 20, 22, 24, 26, 28 (or a sub-set of these instructions, e.g. optionally without performing the update operations 26, 28) are suitably stored on a non-transitory storage medium (not shown) such as a hard disk or other magnetic storage medium, random access memory (RAM), read-only memory (ROM), or another electronic storage medium, an optical disk or other optical storage medium, a combination of the foregoing, or so forth.

The observation tensor formatting operation 16 formats the observation tensor Y with order equal to the number of indices needed to index a sample of the acquired samples 14. For example, in a social network context having users, items, and tags, the observation tensor Y is suitably of order-3 with user, item, and tag dimensions. The size of the user dimension corresponds to the number of users in the social network; the size of the items dimension corresponds to the number of items in the social network; and the size of the tags dimension corresponds to the number of (different) tags in the social network. Typically, each user is unique. Any duplicate items are typically treated as separate, distinct items although this is not necessary. A duplicate item may arise if, for example, two different users upload the same photograph. These duplicate photographs are usually treated as distinct items, although it is contemplated to recognize the duplication and treat them as a single item that is associated with both users. Any duplicate tags are typically treated as a single tag. For example, if several different users tag different photographs with "John Smith" then there is a single tag "John Smith" that is associated with all of the photographs. Without loss of generality, the order of the observation tensor Y is denoted as K (where K>2) and the sizes of the dimensions (i.e., the tensor sizes) are denoted as $n=(n_1, n_2, \ldots, n_K)$.

The operation 18 constructs the loss function to compare a prediction tensor X with the observation tensor Y. The loss function is suitably denoted l(X; Y). The prediction tensor X is of the same order as the observation tensor Y, and the dimensions of the prediction tensor X are of the same size as the corresponding dimensions of the observation tensor Y. Thus, the prediction tensor X has order-K with dimension sizes $n=(n_1, n_2, \ldots, n_K)$. Put another way, each of the tensors X and Y has size $n_1 \times n_2 \times \ldots \times n_K$.

The operation 20 constructs the regularization parameter including a matrix norm decomposition of the tensor trace norm of the prediction tensor. In the illustrative embodiments a K-th order matrix norm decomposition of the tensor trace norm of the prediction tensor; however, other matrix norm decompositions are also contemplated. The illustrative K-th order matrix norm decomposition of the tensor trace norm of the prediction tensor entails determining a set of tensors $A_1, \ldots, A_K$ where $A_k \in \mathfrak{R}^{n_k \times R}$ such that $A_1 \otimes A_2 \otimes \ldots \otimes A_K = X$ (where $\otimes$ denotes the outer matrix product operator) and the set of tensors minimizes the sum $\|A_1\|_K^K + \ldots + \|A_2\|_K^K + \ldots + \|A_K\|_K^K$ (where $\|A_K\|_K$ is the K-th order matrix norm of $A_k$).

More generally, the regularization parameter of the operation 20 may be a p-th order matrix norm decomposition of the tensor trace norm entailing determining a set of tensors $A_1, \ldots, A_K$ such that $A_1 \otimes A_2 \otimes \ldots \otimes A_K = X$ (where $\otimes$ again denotes the outer matrix product operator). During the minimization operation 22 (to be described), the set of tensors is optimized to minimize the sum $\|A_1\|_p^p + \|A_2\|_p^p + \ldots + \|A_K\|_p^p$ (where $\|A_k\|_p^p$ is the p-th order matrix norm of $A_k$ raised to the p-th power). The illustrative case of the K-th order matrix norm decomposition of the tensor trace norm of the prediction tensor X corresponds the case where p=K.

The operation 22 performs a regularized likelihood estimation by minimizing a linear combination of the loss function generated in operation 18 and the regularization parameter generated in operation 20. The linear combination forms a regularized loss function $\{l(X; Y) + \lambda \|X\|_*\}$ where X denotes the prediction tensor, Y denotes the observation tensor, l(X; Y) is the loss function generated in the operation 18, $\lambda \|X\|_*$ is the regularization parameter generated in the operation 20 with $\|X\|_*$ being the matrix norm decomposition of the tensor trace norm of the prediction tensor X, and $\lambda$ being a scalar value. The regularized loss function $\{l(X; Y) + \lambda \|X\|_*\}$ is preferably a convex regularized loss function. The parameter $\lambda$ is chosen as part of the regularization parameter construction operation 20. The value $\lambda$ can be viewed as weighting for the linear combination $\{l(X; Y) + \|X\|_*\}$, and is a tuning parameter selected (e.g., by cross-validation) to prevent overfitting. The output of the minimization operation 22 is the optimized prediction tensor $X_{opt}$. Thus, the operation 22 can be written as $X_{opt} = \text{argmin}_x \{l(X;Y) + \|X\|_*\}$. Advantageously, the operation 22 does not involve the computationally intensive process of tensor unfolding, but instead uses the regularization parameter constructed in the operation 20. Cf. Tomioka et al., "Estimation of Low-Rank Tensors Via Convex Optimization" at arXiv.org, submitted Oct. 5, 2010 (available at http://arxiv.org/abs/1010.0789, last accessed May 30, 2012).

The optimized prediction tensor $X_{opt}$ is suitably used as the basis of an inference engine comprising the computer or other electronic data processing device 12 programmed to perform the inference operation 24 using the optimized prediction tensor $X_{opt}$. For example, if the elements of the observation tensor Y store observed likelihood values for the association of the indexed values, then the elements of the optimized prediction tensor $X_{opt}$ provide likelihood values for all possible associations of indexed values.

The optimized prediction tensor $X_{opt}$ is generated to be as similar as practicable to the observation tensor Y as measured by the regularized loss function $\{l(X;Y) + \lambda \|X\|_*\}$. Optionally, during operation of the inference engine additional samples are acquired in operation 26. For example, if the inference operation 24 generates a list of proposed tags for an item, then the actual tags chosen by the user (which may agree in whole, in part, or not at all with the list of proposed tags) constitute additional samples suitably acquired by operation 26. In the optional warm reboot operation 28 these additional samples are added to the original (or previous) set of acquired samples 14 to form an updated set of acquired samples which are then formatted as an (updated) observation tensor Y in the operation 16 from which an updated optimized prediction tensor $X_{opt}$ is generated as per operations 18, 20, 22. For example, such a warm reboot may be performed on a scheduled basis (e.g., daily, or weekly, et cetera) or when performance metrics of the inference operation 26 indicate that a warm reboot would be advantageous. Optionally, the updating of the samples set and of the observation tensor Y may include discarding samples that are deemed too old or that appear to be "outliers" based on a suitable outlier criterion.

Figure 2:
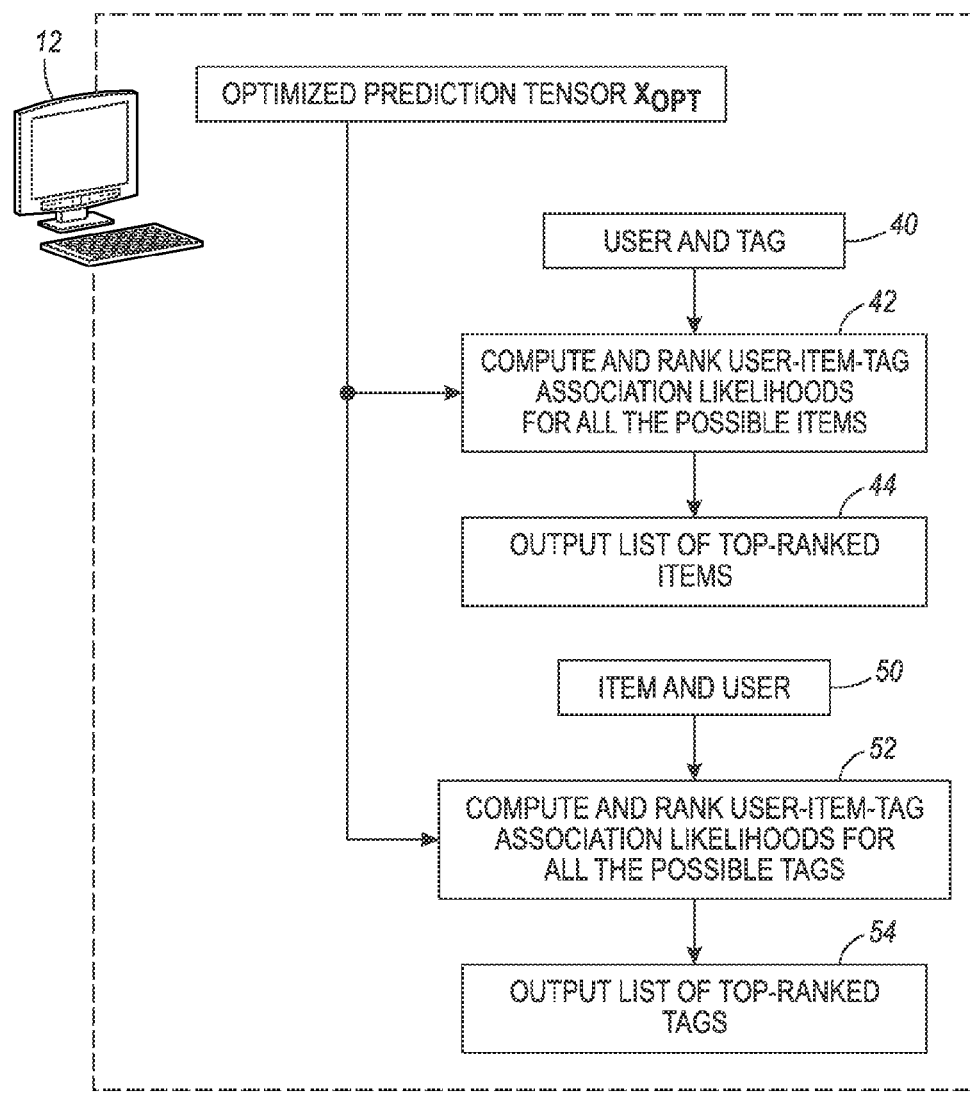
FIG. 2 diagrammatically shows application of the inference system of FIG. 1 for performing selected recommendation operations in the context of an electronic social network.

With reference to FIG. 2, an illustrative example of the inference operation 24 is shown in the context of a social network for which the observation tensor Y of order K represents a set of social network observations and includes at least dimensions corresponding to (1) users, (2) items, and (3) tags. In a first inference example shown in FIG. 2, one or more user associations are recommended for a (User, tag) input 40 of the social network based on the optimized prediction tensor X. (For notational convenience, the "input" User for whom the recommendations are to be made is capitalized in this example, and the users that are recommended as associations are written without capitalization). In an operation 42 corresponding to the operation 24 of FIG. 1, a user is identified, a tag is chosen and user-item-tag association likelihoods are computed for all the interesting items and ordered. This can be done in a straightforward manner using the optimized prediction tensor $X_{opt}$ which was generated by solving the regularized likelihood estimation in operation 22 to minimize loss between the prediction tensor X and the observation tensor Y. With this loss minimized, it is reasonable to expect that elements of the optimized prediction tensor $X_{opt}$ that correspond to elements of the observation tensor Y storing actual user-user association samples should be close matches with the observed samples. The remaining elements of the optimized prediction tensor $X_{opt}$ that correspond to possible user-user associations that have not (yet) been observed should therefore be of predicative value. In an operation 44, the top ranked users are output (e.g., displayed on a screen of the computer 12 or another user interface device) as suggested associations for the User 40. The ranking can employ a "top-N" ranking, or can list all users whose association probability exceeds a threshold, or so forth.

With continuing reference to FIG. 2, as another example one or more tags are recommended for an (item, user) input 50 of the social network based on the optimized prediction tensor $X_{opt}$. In an operation 52 corresponding to the operation 24 of FIG. 1, user-item-tag association likelihoods are computed and ranked for tags used in the social network. This can be done in a straightforward manner using the optimized prediction tensor $X_{opt}$ which was generated by solving the regularized likelihood estimation in operation 22 to minimize loss between the prediction tensor X and the observation tensor Y. With this loss minimized, it is reasonable to expect that elements of the optimized prediction tensor $X_{opt}$ that correspond to elements of the observation tensor Y storing actual samples should be close matches with the observed samples. The remaining elements of the optimized prediction tensor $X_{opt}$ that correspond to possible user-item-tag associations that have not (yet) been observed should therefore be of predicative value. In an operation 54, the top ranked tags are output (e.g., displayed on a screen of the computer 12 or another user interface device) as suggested labels for the item 50. The ranking can employ a "top-N" ranking, or can list all users whose association probability exceeds a threshold, or so forth.

The examples of FIG. 2 are merely illustrative examples. More generally, in the social network context the operation 24 recommends an association between elements of the social network of one or more element types of a group of element types including at least user, item, and tag element types based on the optimized prediction tensor $X_{opt}$.

Still more generally (and for generalized contexts, e.g. a social network context, a chemical formulation space context, a call center context, et cetera), each dimension of the optimized prediction tensor $X_{opt}$ indexes elements of an element type and operation 24 infers a likelihood metric for an element-element association based on the optimized prediction tensor $X_{opt}$.

In the following, some examples are given of the illustrative example of the regularization parameter construction operation 20 in which the regularization parameter includes a K-th order matrix norm decomposition $\|X\|_*$ of the tensor trace norm $\|X\|$ of the prediction tensor X is constructed.

In the case of a matrix (that is, a tensor of order-2), the trace norm can be formulated as the solution to the following semi-definite program (positive semidefinite, i.e. PSD):

$$\|X\|_* = \min_{Z \in S_n^+} tr(Z) \text{ such that } \mathcal{A}Z = X \qquad (1)$$

where $n = n_1 + n_2$, $S_n^+$ denotes the (convex) set of symmetric positive definite matrices and $\mathcal{A}$ is the linear operator that selects the off-diagonal $n_1$ by $n_2$ block of matrix Z, that is, $[\mathcal{A}Z]_{ij} = Z_{i(j+n_1)}$ for $(i,j) \in \{1, \ldots, n_1\} \times \{(1, \ldots, n_2\}$. For tensors of order K>2, a tensor can be viewed as a multi-way table indexed by K-tuples. The tensor X has order-K with dimension sizes $n = (n_1, n_2, \ldots, n_K)$. Put another way, each of the tensors X and Y has size $n_1 \times n_2 \times \ldots \times n_K$. The tensor is said to be symmetric if $n_1 = n_2 = \ldots = n_K$ and is invariant by any permutation of its indices. The notation $Tx^K$ is used herein to denote the tensor-vectors dot product $\Sigma_{i_1} \ldots \Sigma_{i_K} T_{i_1 i_2 \ldots i_K} x_{i_1} x_{i_2} \ldots x_{i_K}$. The outer matrix product $\otimes_{k=1}^K X^{(k)}$ is defined between matrices $X^{(1)} \in \mathfrak{R}_{n_1 \times R}, \ldots, X^{(K)} \in \mathfrak{R}_{n_K \times R}$ all having exactly R columns, as being a tensor of order or order K with dimensions $n_1, \ldots, n_K$ where the entry with indices $(i_1, \ldots, i_K)$ is equal to the multi-linear dot product $\Sigma_{r=1}^R \Pi_{k=1}^K X_{i_k,r}^{(k)}$. A generalization of the PSD set $S_{n,K}^+$ to the set of symmetric semi-definite tensors is the following:

$$S_{n,K}^+ = \{T \in (\mathfrak{R}^n)^K; T_x^K \geq 0\} \quad (2)$$

A property of this set $S_{n,K}^+$ is that it is convex. It can be shown that for K even, the set $S_{n,K}^+$ is a non-empty convex set. For n odd, $S_{n,K}^+ = \{0\}$. To show this, assume X and Y are elements of $S_{n,K}^+$. Then, any convex combination of these two tensors X and Y is convex because $\lambda X + (1-\lambda) Y > 0$ for $\lambda \in [0,1]$. It contains at least one element (e.g., the null tensor). The usual matrix definition of positive-semidefiniteness is recovered by recognizing that $S_n^+ = S_{n,2}^+$.

The tensor trace norm decomposition disclosed herein is first developed for the case of tensor X of order-K where K is even. The sum of the sizes up to order k is denoted by $n_{\leq k} = \Sigma_{l=1}^k n_l$ and the shorthand notation $n = n_{\leq k}$ is employed herein. The tensor trace norm is defined as follows:

$$\|X\|_* = \min_{Z \in S_{n,k}^+} tr(Z) \text{ such that } \mathcal{A}Z = X \quad (3)$$

where $\mathcal{A}$ is the linear operator that selects the off-diagonal tensor with dimensions $n = (n_1, n_2, \ldots, n_K)$, that is, for any K-tuple $i = (i_1, \ldots, i_K)$ the output is $\mathcal{A} = Z_{i_1(i_2+n_1)(i_3+n_{\leq 2}) \ldots (i_K+n_{\leq K-1})}$. The problem of Equation (3) is strictly convex and defined on a non-empty set. This means that there is a unique minimum value that can be found using convex optimization techniques.

Equation (3) was developed for the case of tensor X of order-K where K is even. Tensors with an odd order can be accommodated by adding an extra dimension with constant type. However, further analysis has shown that Equation (3) and the further results presented herein derived from Equation (3) operate effectively for cases in which the tensor X is of odd order-K.

It can be shown that the quantity defined in Equation (3) is a norm. To show this, the following triangular inequality is shown (positive homogeneity and zero norm null tensor proofs are trivial):

$$\|X\|_* + \|X'\|_* = \min_{\mathcal{A}Z = X} tr(Z) + \min_{\mathcal{A}Z' = X'} tr(Z') \quad (4)$$

$$= \min_{\mathcal{A}Z - X = 0, \mathcal{A}Z' - X' = 0} tr(Z + Z') \quad (5)$$

$$\geq \min_{\mathcal{A}Z - X = \mathcal{A}Z' - X'} tr(Z + Z') \quad (6)$$

$$= \min_{\mathcal{A}(Z+Z') = (X+X')} tr(Z + Z') \quad (7)$$

$$= \min_{\mathcal{A}Z'' = (X+X')} tr(Z'') \quad (8)$$

$$= \|X + X'\| \quad (9)$$

In the previous calculus, the PSD constraint $S_{n,K}^+$ was not mentioned for clarity.

The tensor trace norm of Equation (3) can be written using a useful variational formulation as the minimum of a sum matrix norm powers as follows:

$$\|X\|_* = \frac{1}{K} \min_{(\otimes_{k=1}^K W_k) = X} \sum_{k=1}^K \|W_k\|_K^K \quad (10)$$

We used the power-K extension of the Frobenius for $\|W_k\|_K^K$ defined as follows:

$$\|W_k\|_K^K = \sum_{i=1}^n \sum_r^R W_{kir}^K \quad (10a)$$

Equivalence of the variational formulation of Equation (10) and the formulation of Equation (3) can be shown as follows. Define W as the column concatenation of $W_1, \ldots, W_K$. It is always possible to find a tensor Z such that $\mathcal{A}Z = X$ and $Z = \otimes_{k=1}^K W$ (this is an order K polynomial in the elements of W). The second inequality $(Z = \otimes_{k=1}^K W)$ implies that Z is a positive sum of R symmetric rank-1 real tensors (each of them is PSD). Hence, their combination is also PSD, so that the PSD constraint $Zx^K > 0$ is satisfied. Moreover, by recalling that the diagonal elements of the tensor Z are $\Sigma_{r=1}^R W_{ir}^K$, for $i \in \{1, \ldots, n\}$, it follows that $tr(Z) = tr(\otimes_{i=1}^K W) = \Sigma_{k=1}^K \|W_k\|_K^K$ which is the objective function of Equation (10). It can be proved that this formulation is also a norm for odd orders, but it was not the case for the definition of Equation (3). Similar analysis can be performed in the context of matrices. See Jaggi et al., "A simple algorithm for nuclear norm regularized problems", in Proc. Of the 27$^{th}$ Intl Conf. on Machine Learning (ICML 2010) pages 471-478 (2010); Srebro et al., "Maximum-margin matrix factorization", in Advances in Neural Information Processing Systems vol. 17 pages 1329-1336, MIT Press, 2005. In the case where X is a $n_1 \times n_2$ matrix with $R = \min(n_1, n_2)$ this yields:

$$\|X\|_* = \frac{1}{2} \min_{AB^T = X, A \in \mathfrak{R}^{n_1 \times R}, B \in \mathfrak{R}^{n_2 \times R}} \{\|A\|^2 + \|B\|^2\} \quad (11)$$

It is also interesting to see the fourth-order version of this equation for a tensor of size $n_1 \times n_2 \times n_3 \times n_4$ and maximal rank R:

$$\|X\|_* = \frac{1}{4}\left(\min_{A_1 \otimes A_2 \otimes A_3 \otimes A_4 = X} (\|A_1\|_4^4 + \|A_2\|_4^4 + \|A_3\|_4^4 + \|A_4\|_4^4)\right) \quad (12)$$

where $A_1 \in \mathfrak{R}^{n_1 \times R}, A_2 \in \mathfrak{R}^{n_2 \times R}, A_3 \in \mathfrak{R}^{n_3 \times R}, A_4 \in \mathfrak{R}^{n_4 \times R}$, $\|A_1\|_4$ is the fourth-order matrix norm of $A_1$, $\|A_2\|_4$ is the fourth-order matrix norm of $A_2$, $\|A_3\|_4$ is the fourth-order matrix norm of $A_3$, $\|A_4\|_4$ is the fourth-order matrix norm of $A_4$, and $\otimes$ denotes the outer matrix product operator.

As another example, consider the analogous case to Equation (13) for a tensor of order-3:

$$\|X\|_* = \frac{1}{3}\left(\min_{A_1 \otimes A_2 \otimes A_3 = X} (\|A_1\|_3^3 + \|A_2\|_3^3 + \|A_3\|_3^3)\right) \quad (13)$$

where $A_1 \in \mathfrak{R}^{n_1 \times R}, A_2 \in \mathfrak{R}^{n_2 \times R}, A_3 \in \mathfrak{R}^{n_3 \times R}$, $\|A_1\|_3$ is the third-order matrix norm of $A_1$, $\|A_2\|_3$ is the third-order matrix norm of $A_2$, and $\|A_3\|_3$ is the third-order matrix norm of $A_3$.

The general case for a tensor of order-K using a K-th order matrix norm decomposition of the tensor trace norm of the prediction tensor X is:

$$\|X\|_* = \frac{1}{K}\left(\min_{A_1 \otimes A_2 \otimes \ldots \otimes A_K = X}(\|A_1\|_K^K + \|A_2\|_K^K + \ldots + \|A_K\|_K^K)\right) \quad (14)$$

where $A_k \in \mathfrak{R}^{n_k \times R}$, $\|A_k\|_K$ is the K-th order matrix norm of $A_k$.

Even if Equation (3) is convex, it can be difficult to solve in practice. It is believed that at present there is no on-the-shelf solver that can handle the tensor-SDP constraint. At present there does not seem to be a convex optimization technique that can handle this type of constraint. Even gradient projection does not work because we do not know how to project on the tensor-SDP constraint. However, using the variational formulation of Equation (10), the problem can be reparameterized to obtain an unconstrained objective. This has been done for matrices. See Rennie et al., "Fast maximum margin matrix factorization for collaborative prediction", in Proc. of the $22^{nd}$ Int'l. Conf. on Machine Learning (ICML, pages 713-719, ACM 2005). In the instant case a rank R is chosen along with a function $f: \mathfrak{R}^{n \times R} \mapsto S_{n,K}^+$ such that $f(W) = \sum_{r=1}^R \lambda_r \omega_r \otimes^K$ where $W = (\omega_1, \ldots, \omega_R)$. Then, the reparameterization $Z = f(W)$ guarantees that $Z \in S_{n,K}^+$. The resulting problem is no longer convex; however, if a local minimum is found that does not change with higher value of R, the local minimum is also a global minimum. Hence, one can greedily increase R until the global minimum is found. We know that we obtain the global minimum if the resulting matrix is rank deficient, so the memory requirement is R*+1, where R* is the rank of the optimal solution. The proof for the matrix case is adaptable to the tensor case. See Bach et al., "Convex sparse matrix factorizations", Technical report HAL-00345747, 2008 (see Proposition 4). At the end of the procedure, the most complex problem is in $\mathfrak{R}^{n \times R}$, hence, assuming that the solution is of low rank, the optimum can be found at a cost which can be significantly cheaper than the full optimization in $S_{n,K}^+$.

The tensor trace norm can be used in many applications that advantageously employ a norm, including but not limited to collaborative filtering, data imputation, multitask structured learning, and so forth. These applications can be expressed as a penalized likelihood estimation. Such problems can be formulated as described with reference to FIGS. 1 and 2, in which some (generally noisy) observations are formatted in a K-th order observation tensor Y, possibly with missing entries. The objective is to optimize the prediction tensor X to generate the optimized prediction tensor $X_{opt}$ by minimizing the convex objective, that is to solve:

$$X_{opt} = \underset{X}{\mathrm{argmin}}\{\ell(X;Y) + \lambda\|X\|_*\} \quad (15)$$

where $l(X;Y)$ is a convex loss function that is minimal when the tensors X and Y match exactly and $\lambda$ is a scalar chosen by trial-and-error, cross-validation, or another technique to prevent overfitting.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by an electronic data processing device to perform a method including minimizing a convex regularized loss function respective to a prediction tensor X of order K having dimensions $n_1, n_2, \ldots, n_K$ to generate an optimized prediction tensor of order K where K>2 and the convex regularized loss function comprises a linear combination of
   (i) a loss function e(X; Y) comparing the prediction tensor X and an observation tensor Y of order K representing a set of observations and
   (ii) a regularization parameter $\lambda\|X\|_*$ where $\lambda$ is a scalar value and $\|X\|_*$ is a K-th order matrix norm decomposition of the tensor trace norm of the prediction tensor X given by $$\|X\|_* = \frac{1}{K}\left(\min_{A_1 \otimes A_2 \otimes \ldots \otimes A_K = X}(\|A_1\|_K^K + \|A_2\|_K^K + \ldots + \|A_K\|_K^K)\right)$$

where $A_k \in \mathfrak{R}^{n_k \times R}$, $R = \max\{n_1, n_2, \ldots, n_K\}$, $\|A_k\|_K$ is the K-th order matrix norm of $A_k$, and $\otimes$ denotes the outer matrix product operator.

2. The non-transitory storage medium of claim 1 wherein the prediction tensor X is of order-3 and has dimensions $n_1$, $n_2$, $n_3$ and $$\|X\|_* = \frac{1}{3}\left(\min_{A_1 \otimes A_2 \otimes A_3 = X}(\|A_1\|_3^3 + \|A_2\|_3^3 + \|A_3\|_3^3)\right)$$

where $A_1 \in \mathfrak{R}^{n_1 \times R}$, $A_2 \in \mathfrak{R}^{n_2 \times R}$, $A_3 \in \mathfrak{R}^{n_3 \times R}$, $\|A_1\|_3$ is the third-order matrix norm of $A_1$, $\|A_2\|_3$ is the third-order matrix norm of $A_2$, and $\|A_3\|_3$ is the third-order matrix norm of $A_3$.

3. The non-transitory storage medium of claim 1 wherein the prediction tensor X is of order-4 and has dimensions $n_1$, $n_2$, $n_3$, $n_4$ and $$\|X\|_* = \frac{1}{4}\left(\min_{A_1 \otimes A_2 \otimes A_3 \otimes A_4 = X}(\|A_1\|_4^4 + \|A_2\|_4^4 + \|A_3\|_4^4 + \|A_4\|_4^4)\right)$$

where $A_1 \in \mathfrak{R}^{n_1 \times R}$, $A_2 \in \mathfrak{R}^{n_2 \times R}$, $A_3 \in \mathfrak{R}^{n_3 \times R}$, $A_4 \in \mathfrak{R}^{n_4 \times R}$, $\|A_1\|_4$ is the fourth-order matrix norm of $A_1$, $\|A_2\|_4$ is the fourth-order matrix norm of $A_2$, $\|A_3\|_4$ is the fourth-order matrix norm of $A_3$, and $\|A_4\|_4$ is the fourth-order matrix norm of $A_4$.

4. The non-transitory storage medium of claim 1 where K=3.

5. The non-transitory storage medium of claim 1 where K=4.

6. The non-transitory storage medium of claim 1 wherein the observation tensor of order K represents a set of social network observations and includes at least dimensions corresponding to (1) users, (2) items, and (3) tags.

7. The non-transitory storage medium of claim 6 wherein the method further includes recommending an association between elements of the social network of one or more element types of a group of element types including at least user, item, and tag element types based on the optimized prediction tensor.

8. The non-transitory storage medium of claim 6 wherein the method further includes recommending one or more user associations for a user of the social network based on the optimized prediction tensor.

9. The non-transitory storage medium of claim 6 wherein the method further includes recommending one or more tags for an item of the social network based on the optimized prediction tensor.

10. The non-transitory storage medium of claim 1 wherein each dimension of the optimized prediction tensor indexes elements of an element type and the method further includes inferring a likelihood metric for an element-element association based on the optimized prediction tensor.

11. An apparatus comprising:
a non-transitory storage medium as set forth in claim 1; and
an electronic data processing device configured to execute instructions stored on the non-transitory storage medium.

12. A method comprising:
minimizing a convex regularized loss function respective to a prediction tensor of order K to generate an optimized prediction tensor of order K where K>2 and the convex regularized loss function comprises a linear combination of
(i) a loss function comparing the prediction tensor and an observation tensor of order K representing a set of observations and
(ii) a regularization parameter including a matrix norm decomposition of the tensor trace norm of the prediction tensor; and
performing an inference operation using the optimized prediction tensor;
wherein the minimizing does not employ tensor unfolding; and
wherein the minimizing and the performing of an inference operation are performed by an electronic data processing device.

13. The method of claim 12 wherein the matrix norm decomposition of the tensor trace norm of the prediction tensor is a K-th order matrix norm decomposition of the tensor trace norm of the prediction tensor.

14. The method of claim 12 wherein the matrix norm decomposition of the tensor trace norm of the prediction tensor is proportional to:

$$\min_{A_1 \otimes A_2 \otimes \ldots \otimes A_K = X} (\|A_1\|^p + \|A_2\|^p + \ldots + \|A_K\|^p)$$

where X is the prediction tensor, $\|A_k\|^p$ is the matrix norm of a tensor $A_k$, p is a scalar, and $\otimes$ denotes the outer matrix product operator.

15. The method of claim 12 wherein the prediction tensor of order K has dimensions $n_1, n_2, \ldots, n_K$ with $R=\max\{n_1, n_2, \ldots, n_K\}$ and the matrix norm decomposition of the tensor trace norm of the prediction tensor is proportional to:

$$\min_{A_1 \otimes A_2 \otimes \ldots \otimes A_K = X} (\|A_1\|_p^p + \|A_2\|_p^p + \ldots + \|A_K\|_p^p)$$

where X is the prediction tensor, $\|A_k\|_p^p$ is the p-th order matrix norm of $A_k$ raised to the p-th power, and $\otimes$ denotes the outer matrix product operator.

16. The method of claim 15 wherein p=K.

17. The method of claim 12 where K>3.

18. The method of claim 12 wherein the observation tensor of order K represents a set of observations of a social network and the observation tensor includes at least dimensions corresponding to (1) users, (2) items, and (3) tags of the social network.

19. The method of claim 18 wherein the performing an inference operation using the optimized prediction tensor includes:
recommending an association between elements of the social network of one or more element types of a group of element types including at least user, item, and tag element types based on the optimized prediction tensor.

20. The method of claim 18 wherein the performing an inference operation using the optimized prediction tensor includes at least one of:
recommending one or more user associations for a user of the social network based on the optimized prediction tensor; and
recommending one or more tags for an item of the social network based on the optimized prediction tensor.

* * * * *